(12) United States Patent
Brunelle et al.

(10) Patent No.: US 7,184,522 B2
(45) Date of Patent: Feb. 27, 2007

(54) METHOD AND APPARATUS FOR MANAGING CALLS THROUGH AN ENTERTAINMENT CENTER

(75) Inventors: Michael J. Brunelle, Pelham, NH (US); Allan E. Brockenbrough, S. Hamilton, MA (US)

(73) Assignee: Comverse, Inc., Wakefield, MA (US)

( * ) Notice: Subject to any disclaimer, the term of this patent is extended or adjusted under 35 U.S.C. 154(b) by 0 days.

(21) Appl. No.: 09/855,839

(22) Filed: May 16, 2001

(65) Prior Publication Data

US 2002/0172330 A1 Nov. 21, 2002

(51) Int. Cl.
*H04M 1/64* (2006.01)

(52) U.S. Cl. ............... 379/88.17; 379/93.23; 379/211.01; 348/563; 725/38

(58) Field of Classification Search ............ 379/67.1, 379/69, 70, 79, 81, 82, 92.04, 93.07, 93.11, 379/93.23, 93.25, 142.06, 88.13, 88.14, 88.15, 379/110.01, 215.01, 142.16; 386/125; 725/49; 348/552

See application file for complete search history.

(56) References Cited

U.S. PATENT DOCUMENTS

| | | | |
|---|---|---|---|
| 1,966,184 A | | 7/1934 | O'Neill |
| 2,210,636 A | | 8/1940 | Schelkunoff |
| 3,328,510 A | | 6/1967 | White |
| 4,356,509 A | * | 10/1982 | Skerlos et al. ............... 348/552 |
| 5,003,591 A | * | 3/1991 | Kauffman et al. ........... 380/232 |
| 5,128,987 A | | 7/1992 | McDonough et al. |
| 5,539,449 A | | 7/1996 | Blahut et al. |
| 5,623,537 A | * | 4/1997 | Ensor et al. ................ 379/88.2 |
| 5,629,978 A | | 5/1997 | Blumhardt et al. |
| 5,696,815 A | | 12/1997 | Smyk |
| 5,706,334 A | * | 1/1998 | Balk et al. ................ 379/88.13 |
| 5,721,767 A | | 2/1998 | Bae |
| 5,787,259 A | | 7/1998 | Haroun et al. |
| 5,825,862 A | * | 10/1998 | Voit et al. .............. 379/142.16 |
| 5,907,604 A | * | 5/1999 | Hsu ....................... 379/142.06 |
| 5,920,806 A | | 7/1999 | Gouessant |
| 5,987,106 A | | 11/1999 | Kitamura |
| 6,026,150 A | | 2/2000 | Frank et al. |
| 6,029,047 A | | 2/2000 | Ishida et al. |
| 6,088,723 A | | 7/2000 | Shim |
| 6,125,176 A | | 9/2000 | Foladare et al. |
| 6,154,531 A | | 11/2000 | Clapper |
| 6,157,411 A | | 12/2000 | Williams et al. |
| 6,172,712 B1 | | 1/2001 | Beard |
| 6,173,115 B1 | * | 1/2001 | Willis ......................... 386/125 |
| 6,195,726 B1 | * | 2/2001 | Hogan .......................... 386/35 |
| 6,243,448 B1 | * | 6/2001 | Corbett et al. ............ 379/93.35 |
| 6,404,860 B1 | * | 6/2002 | Casellini ................... 379/88.17 |
| 6,505,348 B1 | * | 1/2003 | Knowles et al. ............... 725/49 |
| 6,535,590 B2 | * | 3/2003 | Tidwell et al. .......... 379/110.01 |
| 6,633,635 B2 | * | 10/2003 | Kung et al. ............. 379/215.01 |
| 2001/0038690 A1 | * | 11/2001 | Palmer et al. .......... 379/218.01 |

\* cited by examiner

*Primary Examiner*—Gerald Gauthier
(74) *Attorney, Agent, or Firm*—Staas & Halsey LLP (57) ABSTRACT

An incoming telephone call is held in a telephony network while a subscriber is notified that the call is waiting to be handled. A guide menu presenting call handling options is displayed on an entertainment center while a program played through the entertainment center is paused and recorded. The subscriber selects a desired call handling option using a remote control device and the call is handled in a manner corresponding to the selected call handling option.

20 Claims, 5 Drawing Sheets

METHOD AND APPARATUS FOR MANAGING CALLS THROUGH AN ENTERTAINMENT CENTER

BACKGROUND OF THE INVENTION

1. Field of the Invention

The present invention is directed to managing incoming calls through a home entertainment center and more particularly to a system and method to allow a user to receive incoming telephone calls or text messages through an entertainment center, such as a television, and to control how the incoming call is handled though the entertainment center.

2. Description of the Related Art

It is often the case that when a telephone subscriber is watching a television program, the subscriber receives an incoming telephone call. When the subscriber answers the telephone call, the subscriber is forced to miss a portion of the program currently being viewed. Even if the subscriber employs an off-the-shelf device to record the television program before answering the telephone, it is possible that the call will be missed or a significant portion of the program will be missed.

Thus, it is desirable to provide a method and system in which the subscriber is notified that there is an incoming call directly on their television. In addition, it is also desirable to be able to handle the telephone call through the television by choosing from a list of options displayed on the television, all while the television program has been paused and recorded so that the subscriber can resume watching the program, from the point when the incoming call notification first appeared, after the call has been handled.

SUMMARY OF THE INVENTION

It is an object of the present invention to provide a method and apparatus for notifying a subscriber that an incoming call is waiting at the telephony network through an entertainment center.

It is a further object of the present invention to provide a method and apparatus for pausing and recording a television program being played on the entertainment center when an incoming call is waiting at the telephony network.

It is another object of the present invention to display a guide menu containing call handling options on a television of the entertainment center to allow a subscriber to select a call handling option for handling the incoming call.

It is still another object of the present invention to display caller identification information corresponding to the incoming call on the television.

It is still another object of the present invention to handle the incoming call in accordance with the selected call handling option.

It is another object of the present invention to resume play the recorded television program when the incoming call has been handled.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
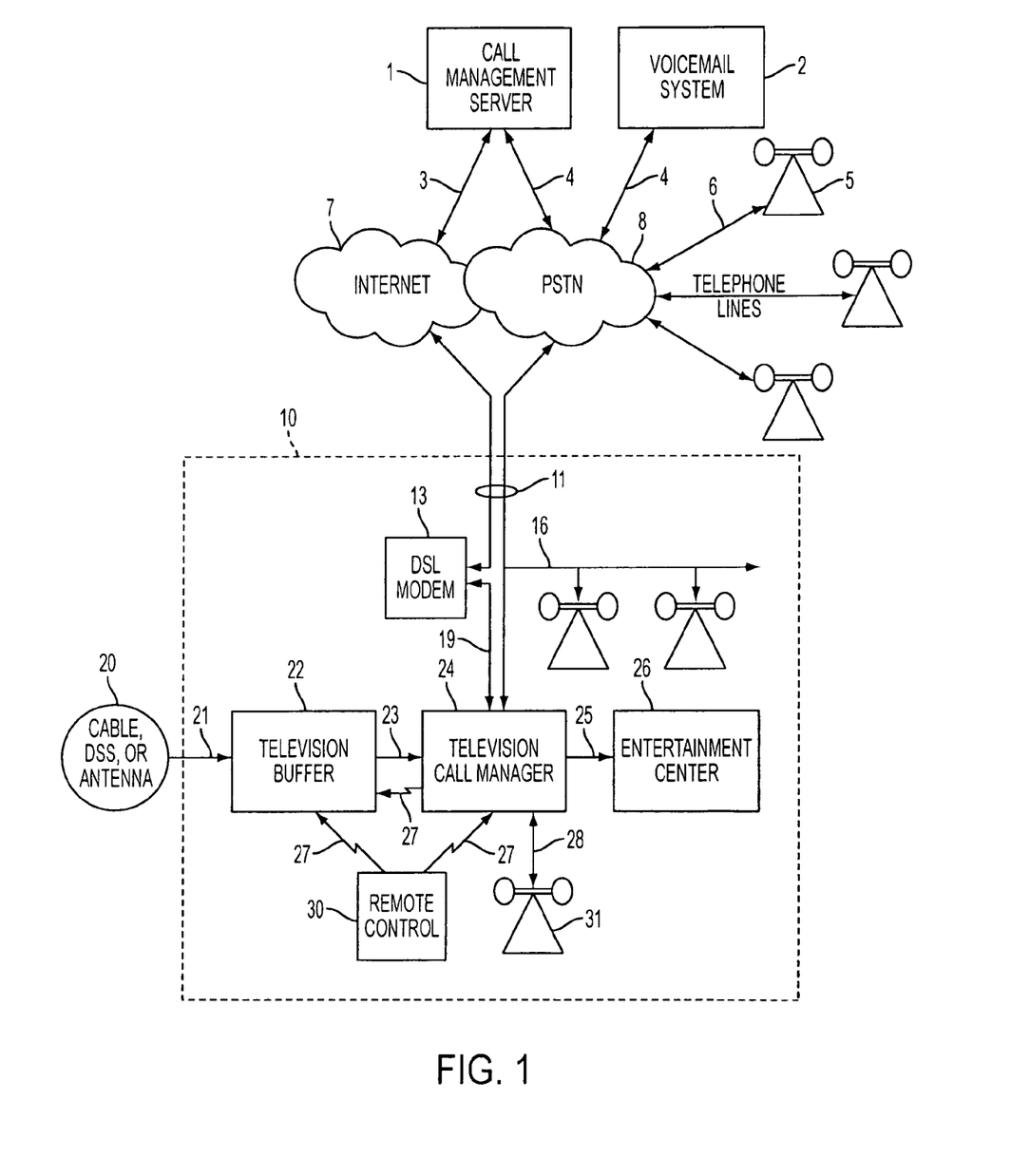
FIG. 1 is a diagram showing the system of the present invention.

FIG. 1 is a diagram showing the system of the present invention. Referring to FIG. 1, a call management server 1 may be located in a telephony provider's network and is typically linked to a subscriber's home via an Internet connection and a publicly switched telephone network ("PSTN") 8. The subscriber's home 10 may be connected to the Internet 7 via a Digital Subscriber Line ("DSL") 11 through a DSL modem 13, for example. The PSTN is connected to the subscriber's home 10 via standard telephone trunks 16.

A voice mail system 2 may also be located in a telephony provider's network and connected to the subscriber's home 10 via the PSTN 8. The voice mail system 2 provides in-network voice mail capabilities to the subscriber. Incoming telephone calls from a telephone 5, for example, may travel over telephone lines 6 through the PSTN 8 and then to the call management server 1, where the calls are held. Thus, an incoming call will be routed to the call management server 1 and held there prior to being routed to the subscriber's home 10. This process will be described in detail later. The call management server 1 is also preferably connected to the Internet 7 via a broad band Internet connection 3, commonly known in the art.

Inside the boundary of the subscriber's home, as shown in FIG. 1, the DSL modem 13 may be connected via an ethernet connection 19 to a television call manager 24. The television call manager 24, described in detail in FIG. 4, could be integrated with an existing set-top box, such as a cable box or satellite receiver, or could be a stand alone piece of equipment which is connected to an entertainment center, i.e., a television, in some manner. Alternatively, the television call manager 24 could be implemented as an application on a personal computer located in the subscriber's home. Such an embodiment would require off-the-shelf hardware accessories connected to the personal computer together with software to operate the accessories. Such hardware and software will not be described herein but is commonly understood by those skilled in the art.

As shown in FIG. 1, the television call manager 24 may be connected to an entertainment center 26, which preferably includes a television. The television call manager 24 is connected to the entertainment center 26 via a connection 25 capable of transmitting audio and video signals therebetween.

A television signal from standard cable, a digital satellite or an antenna 20 is sent into the subscriber's home 10 through line 21 to a television buffer 22. Line 21 should be capable of carrying an RF signal. Television buffer 22 may be in an off-the-shelf device such as Replay TV™ or TiVo™, which is capable of pausing and recording a television show while a call is handled. Once the signal is received by the television buffer 22, it is transmitted via line 23, capable of transmitting audio and video signals, to the television call manager 24.

A remote control device 30 may be employed which is capable of communicating via infra-red or RF signals 27 with the television buffer 22 and the television call manager 24. The remote control device 30 controls the operation of the television call manager 24 and the television buffer 22 as commonly understood in the art. The remote control device 30 can be a radio frequency (RF) type remote control or an infrared (IR) type remote control or a combination of RF and IR.

A telephone 31 may be connected to the television call manager 24 via a telephone line 28. However, it is within the scope of the present invention to handle all standard telephone operations through the television call manager 24, without the need of a telephone 31.

As seen in FIG. 1, telephone line 16 is connected to the subscriber's home 10 and communicates with the PSTN 8. At least one telephone extension 29 may be connected to the incoming telephone line 16. The incoming telephone line is connected to the television call manager 24 as well.

Figure 2:
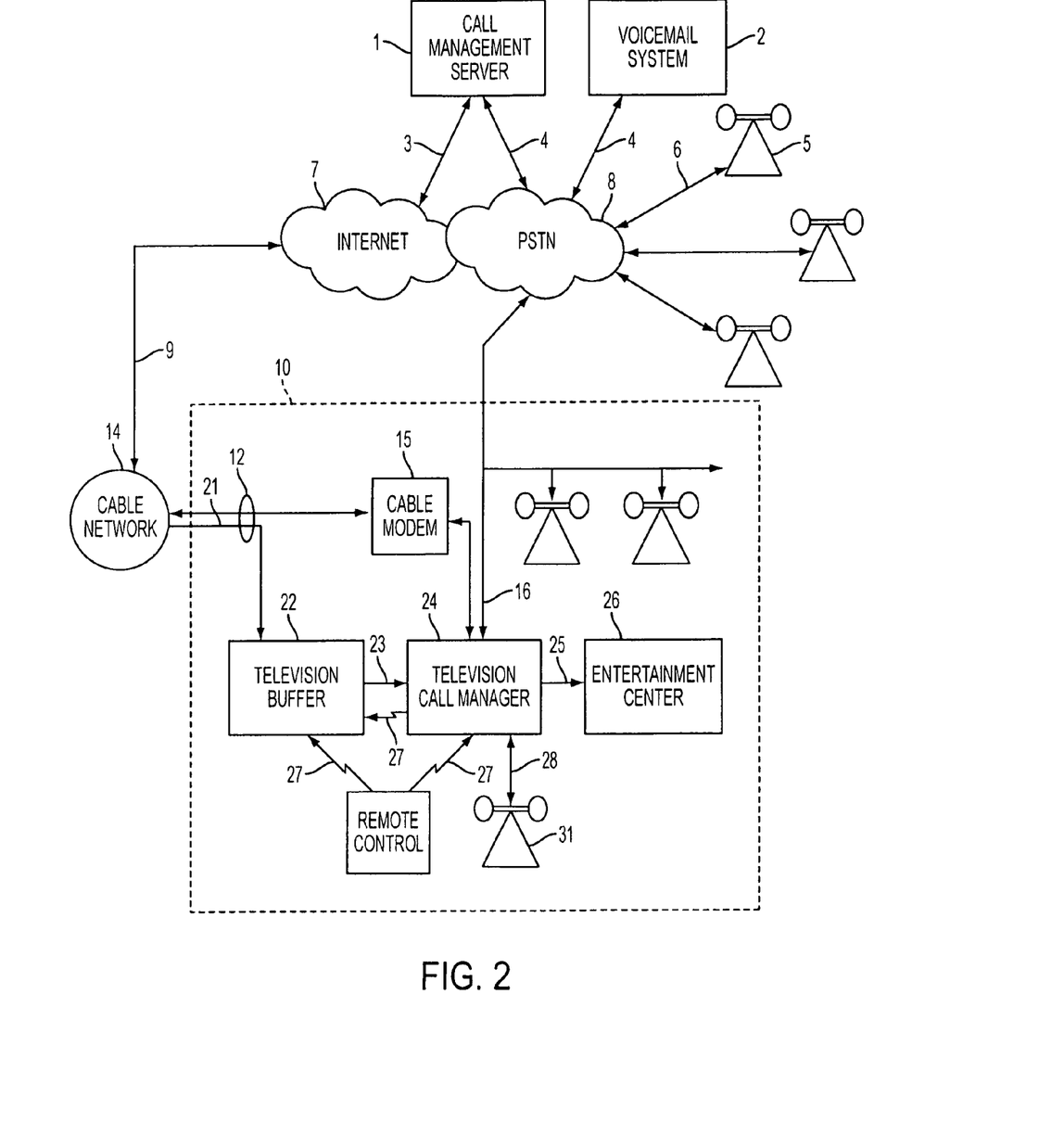
FIG. 2 is a diagram showing the overall system according to a second embodiment of the present invention.

FIG. 2 is a diagram showing the overall system according to a second embodiment of the present invention. Referring to FIG. 2, the system according to this alternative embodiment functions similar to the system illustrated in FIG. 1. However, according to this embodiment, the Internet connection is obtained via a cable network 14 and a cable modem 15, both of which are well known in the art. A broadband Internet connection 9 connects the cable network 14 to the Internet 7 according to this embodiment. Further, the television buffer 22 receives the television signal via the cable network 14. The television call manager 24 is connected via a network connection such as an ethernet connection 19 to the cable modem 15, which facilitates communication via the Internet 7 with the call management server 1. The remainder of this embodiment is similar to the embodiment shown in FIG. 1 and described herein. Accordingly, this description will not be repeated herein.

In the embodiments shown in FIGS. 1 and 2, the television call manager 24 preferably detects when the entertainment center 26 is on and signals the call management server 1 that incoming calls should be handled by the television call manager system. The method used to detect whether the entertainment center 26 is on can be any standard third party piece of hardware such as a television detector, which is known in the art.

The signal from the television call manager 24 is sent to the call management server 1 via the Internet connection. Alternatively, as in the case of the embodiment shown in FIG. 2, the signal from the television call manager 24 is sent via the cable modem 15 and the cable network 14 to the Internet connection 7 and then to the call management server 1. When a caller initiates a call to the subscriber from a telephone 5, and the television call monitor system is in use, the call is routed through the PSTN 8 to the call management server 1.

The incoming call is held at the call management server 1 while the television call manager 24 is notified of the call via the broadband Internet connection 3 through the Internet 7 and the subscriber's Internet connection provided by the DSL modem 13 or cable modem 15, according to the respective embodiment of the invention. The television call manager 24 signals the television buffer 22 using infrared or RF signals 27 to pause a television program and begin recording that television program.

Thereafter, the television buffer 22 begins recording the television program currently being broadcast over the entertainment center 26. Preferably, the television call manager 24 displays an indication of the caller's identification, a caller ID, and a menu of call handling options on a television screen of the entertainment center 26 by sending video information to the entertainment center 26 over audio/video cables 25, which interconnect the two devices.

Preferably, the subscriber uses the remote control device 30 to select an option from the on-screen menu of call handling options being displayed. The call handling options may include, but are not limited to, taking the call, sending the call to voice mail, forwarding the call to another number, playing a canned message to the caller, ignoring the call, or rejecting the call.

If the call handling option selected corresponds to taking the call, the call may be handled either using a standard telephone 31 or with a microphone and the sound system of the entertainment center 26.

If the call handling option corresponds to sending the call to voice mail, the call may be sent to the subscriber's carrier-based voice mail system 2. In an alternative embodiment, the call may be sent to the subscriber's in-home answering machine (not shown).

If the call handling option corresponds to forwarding the call to another number, the call may be forwarded to any one of several pre-configured numbers or a number entered via the remote control 30 in real time.

The subscriber may elect to play any one of several pre-configured voice messages if the call handling option selected corresponds to playing a canned message. The user may also have the option to record and send a custom canned message in real time using a microphone provided by the system of the present invention.

If the call handling option selected corresponds to ignoring the call, the caller is unaware that their call is screened. Alternatively, the call may be rejected outright where the call is disconnected.

Figure 3:
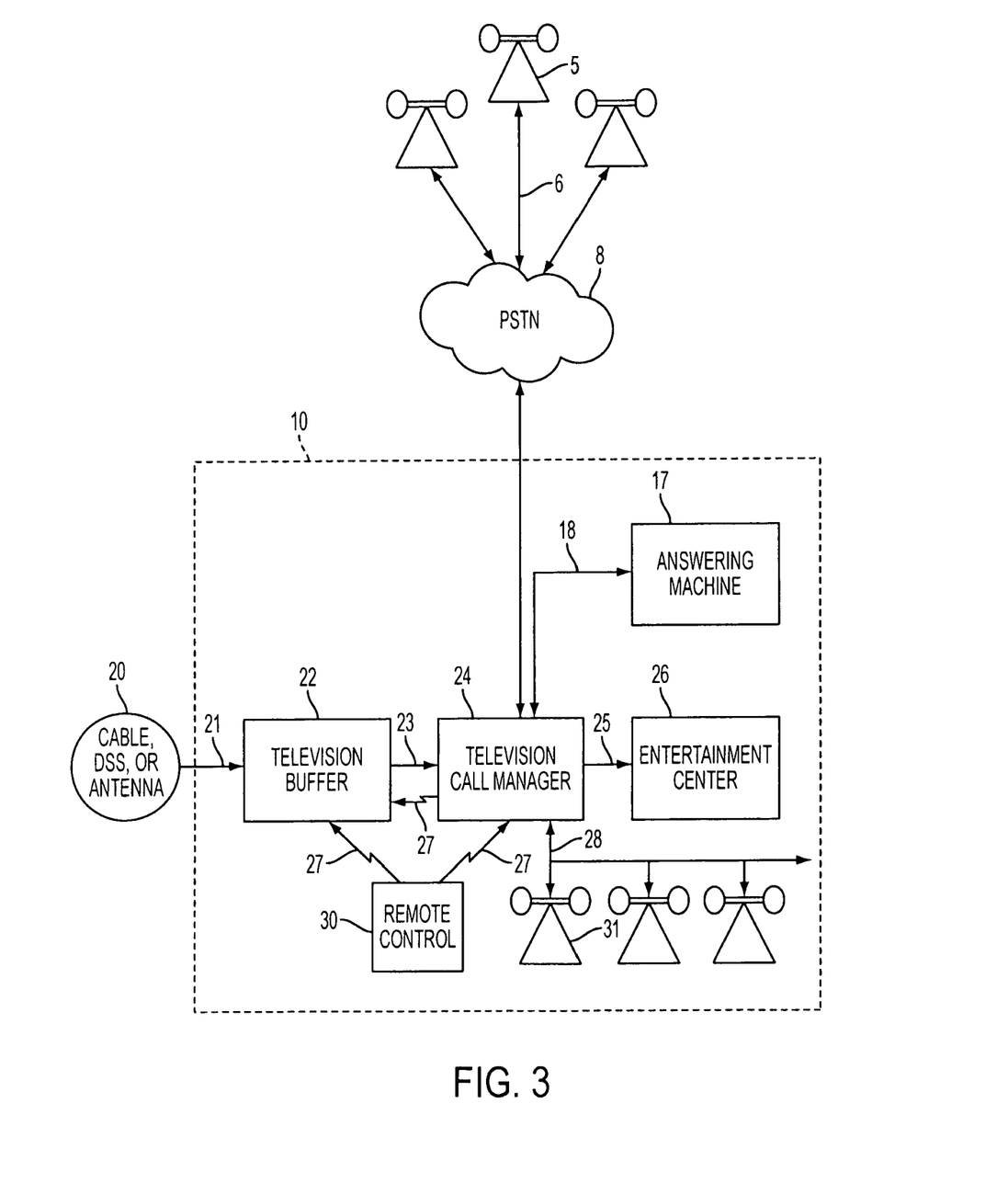
FIG. 3 is a diagram showing the overall system according to a third embodiment of the present invention.

FIG. 3 is a diagram showing the overall system according to a third embodiment of the present invention. The embodiment illustrated by this figure does not require an Internet connection as shown with respect to FIGS. 1 and 2. However, a Caller ID subscription from the subscriber's telephony carrier is necessary for the invention.

Referring to FIG. 3, the television call manager 24 becomes active when the entertainment center 26 is turned on. Again, a television detector 46a may be employed to determine when the television is turned on. When a caller uses a telephone 5 to place a call to the subscriber, the call is routed conventionally through the telephone line 6, through the PSTN 8 and then to the subscriber's home 10. The call arrives at the television call manager 24 over the subscriber's incoming telephone line 16.

The phones in the home may ring once and then the television call manager 24 preferably receives call identification information after the first ring in a manner similar to the well known Caller ID/telephone combination. Once the call identification information is received by the television call manager 24, the television call manager 24 preferably answers the call and plays a greeting customized by the subscriber to the caller.

When the television call manager 24 is playing the customized greeting, the television call manager 24 signals the television buffer 22 to pause and begin recording the television program currently being broadcast on the television of the entertainment center 26. These commands are sent via infrared or RF signals 27.

According to this embodiment, the television call manager 24 displays the caller's identification and a menu of call handling options, such as those discussed above, on the television screen of the entertainment center 26 by sending video information to the television over audio video cables 25, which interconnect these two devices.

As discussed previously, the subscriber may use the remote control device 30 to select a call handling option for the incoming call. The selected commands are sent to the television call manager 24 via infrared or RF signals 27. The operations relating to handling the call are similar to the previously described embodiments and will not be repeated.

Figure 4:
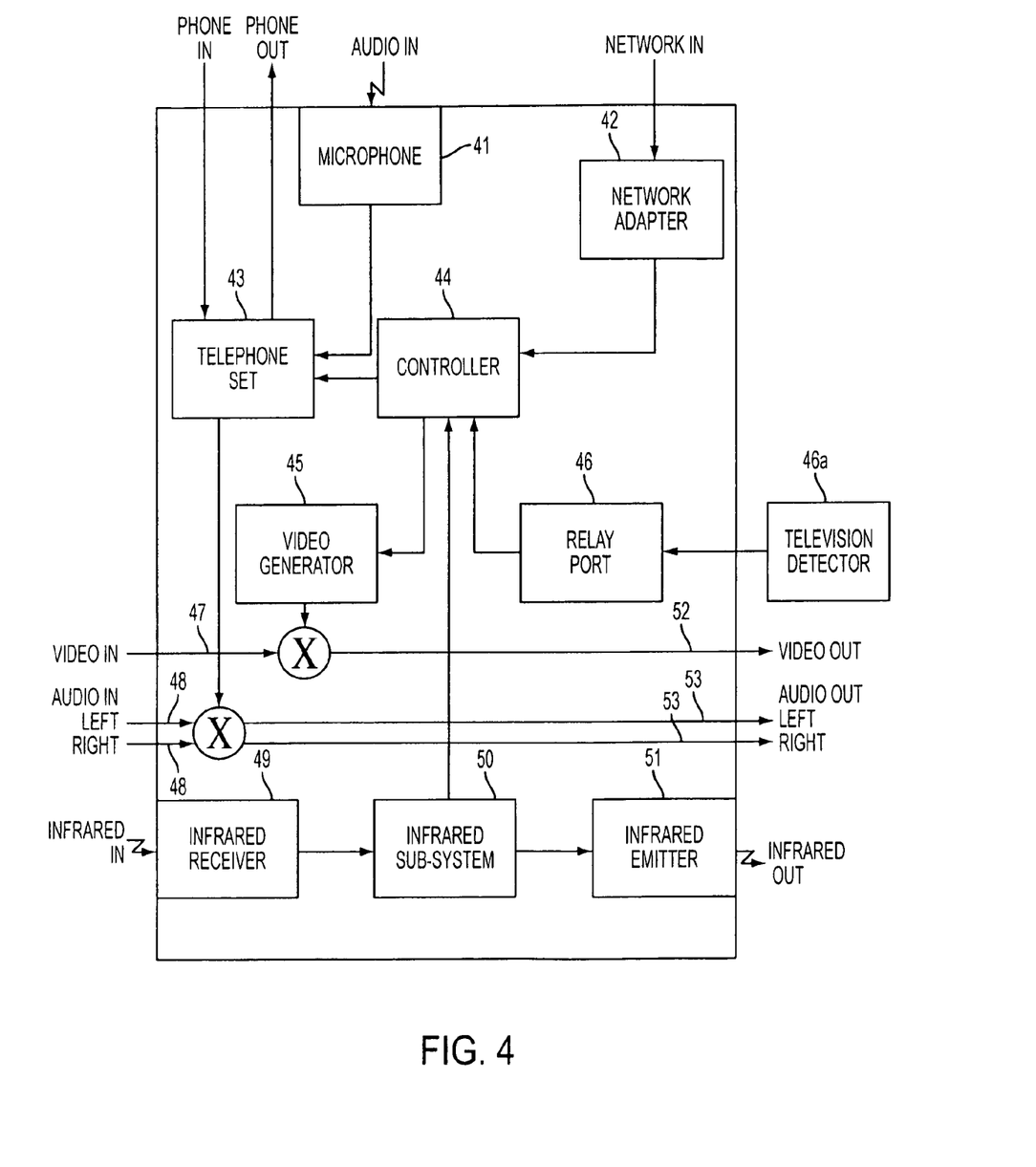
FIG. 4 is a diagram showing the television call manager of the present invention.

FIG. 4 is a diagram showing the television call manager of the present invention. Referring to FIG. 4, the television call manager 24 may preferably include a microphone 41 to receive audio signals and to transmit the audio signals to a telephone set 43. The telephone set 43 includes phone in and phone out lines.

A controller 44 controls the operations of the television call manager 24. The controller 44 may be connected to a network adapter 42, which provides a connection to a network. The TV detector 46a may be connected to the controller through relay port 46. The controller 44 can switch the outgoing video signal 52 from the incoming video signal 47 to a signal coming from a video generator 45. The audio in, left and right signals 48 and the audio from the telephone set 43 are also switchable by the controller 44 and output through audio out left and right lines 53.

An infrared receiver 49 is preferably included to receive infrared signals and to send the infrared signals from the infrared receiver 49 to an infrared sub-system 50 and thereon to controller 44 and an infrared emitter 51. The infrared receiver 49 preferably receives signals from the remote control device 30.

Figure 5:
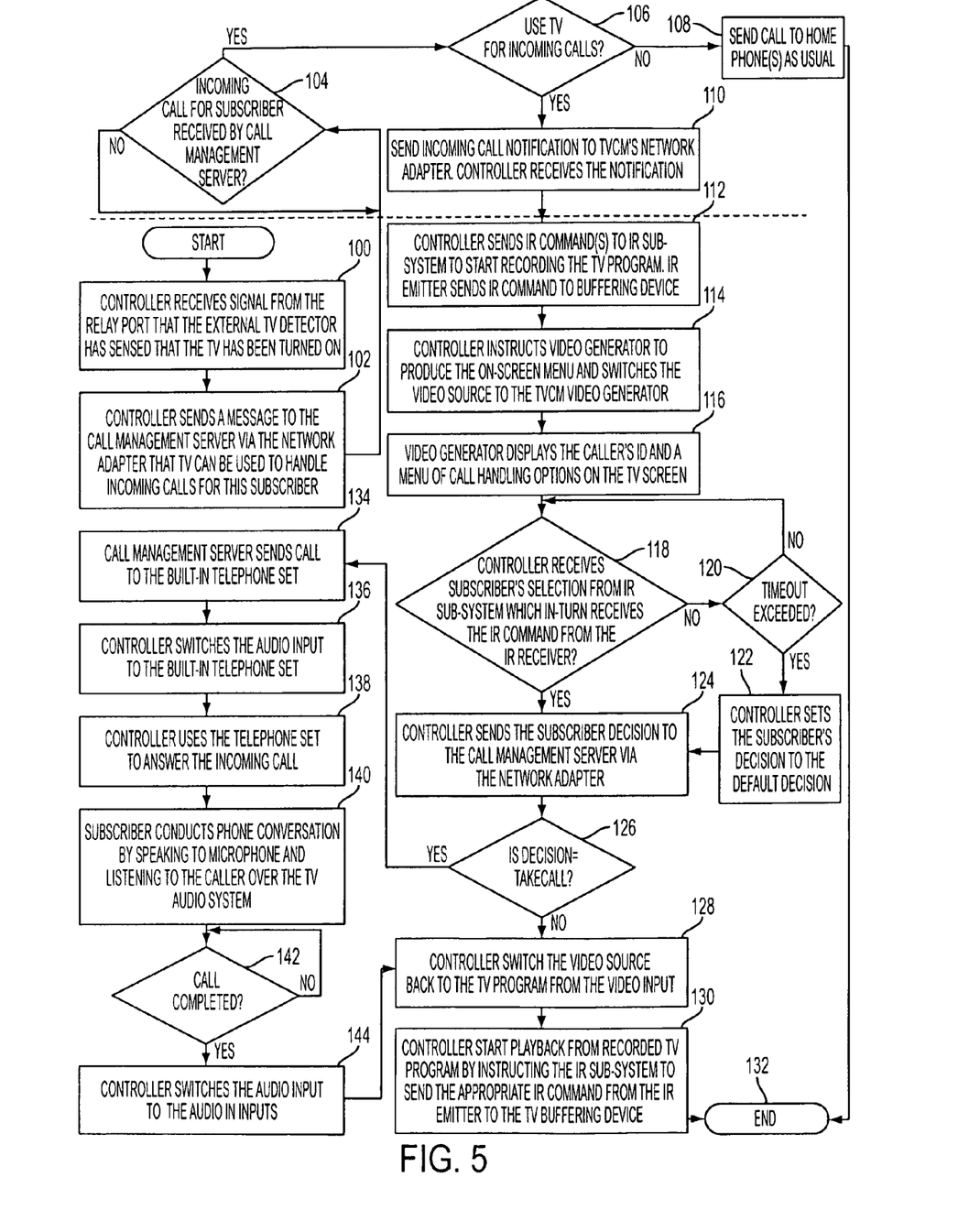
FIG. 5 shows the operational flow of the call management system of the invention.

FIG. 5 shows the operational flow of the call management system of the invention. Referring to FIG. 5, at operation 100, the controller 44 receives a signal from the relay port that an external television detector 46a has sensed that the television has been turned on. Next, in operation 102, controller 44 sends a message to the call management server 1, via the network adapter 42, that the television can be used to handle incoming calls for this subscriber.

Next, in operation 104, it is determined whether an incoming call for a subscriber has been received at the call management server 1. If not, this operation is repeated until an incoming call is being held at the call management server 1 for the subscriber. If there is an incoming call waiting at the call management server 1, the process moves to operation 106.

In operation 106, it is determined whether the television is to be used to handle the incoming call. If not, the processor moves to operation 108, where the call is sent to a home phone in the usual manner. From there, the process moves to operation 132, where the process ends.

However, if it is determined in operation 106 that the television is to be used to handle incoming calls, the process moves to operation 110, where an incoming call notification is sent to the network adapter 42. The network adapter 42 sends a signal to the controller 44 indicating that an incoming call is waiting at the call management server 1.

Next, in operation 112, the controller 44 sends infrared commands to the infrared sub-system 50 to pause and start recording the television program. The infrared emitter 51 sends an infrared command to the television buffer 22.

Next, the process moves to operation 114, where the controller 44 instructs the video generator 45 to produce the on-screen menu, or guide, and switches the video output 52 to the television call monitor video generator 45. Next, in operation 116, the video generator 45 displays the caller's identification and a menu of call handling options on the television screen.

In operation 118, it is determined whether the controller 44 has received the subscriber's selection from the infrared sub-system 50, which in turn receives the infrared command from the infrared receiver 49. If the subscriber's selection has not been received, the process moves to operation 120, where it is determined whether the allotted time for this decision has been exceeded. If the allotted time has not been exceeded, the process loops back to operation 118, where it is again determined whether the controller 44 has received the subscriber's selection.

If in operation 120 it has been determined that the time out has been exceeded, the process moves to operation 122, where the controller 44 sets the subscriber's decision to a default decision, such as send the call to voice mail. From operation 122, the process moves to operation 124, where the controller 44 sends the subscriber's decision to the call management server 1 via the network adapter 42.

If in operation 118, the subscriber's selection has been received at the controller 44, the process moves from operation 118 to operation 124, where the controller sends the subscriber's decision to the call management server 1 via the network adapter 42.

Next, the process moves to operation 126 where it is determined whether the subscriber's decision was to take the call. In other words, it is determined whether the call handling option selected corresponds to "take the call". If in operation 126 it is determined that the decision did not correspond to taking the call, the process moves to operation 128, where the controller 44 switches the video output 52 back to the television program from the video input 47.

Next, in operation 130, the controller 44 starts to play back the recorded television program by instructing the infrared sub-system 50 to send the appropriate infrared command to the infrared emitter 51 and thereon to the television buffer 22. From operation 130, the process moves to operation 132, where the process ends.

However, if in operation 126, if it is determined that the subscriber's decision corresponded to taking the call, the process moves to operation 134, where the call management server 1 preferably sends the call to the built-in telephone set 43. Next, in operation 136, the controller 44 switches the audio output from the external input 48 to the built-in telephone set 43.

Next, the process moves to operation 138, where the controller 44 uses the telephone set 43 to answer the incoming call. Next, in operation 140, the subscriber conducts a telephone conversation by speaking into the microphone 41 and listening to the caller over the television audio system.

In operation 142, it is determined whether the call has been completed. If the call has not been completed, operation 142 is repeated until it is determined that the call has been completed. In operation 144, the controller 44 switches the audio output 53 back to the audio-in inputs 48. From operation 144, the process moves returns to operation 128, where the controller 44 switches the video output 52 back to the television program from the video input 47.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of managing calls through an entertainment system, comprising:
   notifying by an entertainment system call manager, via a data network, a call management server residing in a telephony provider network to monitor calls on the telephony provider network for the entertainment system;
   holding in the telephony-network-resident call management server a call on the telephony provider network for the entertainment system prior to routing the call to the entertainment system, in response to the notifying;
   receiving in the entertainment system call manager a held call signal indicating a held call, during a program play by the entertainment system to a user, via the data network from the telephony-network-resident call management server;
   presenting by the call manager a selectable call handling option chosen from a group comprising one or more of take the call, send the call to voice mail, forward the call to another number, play a message, ignore the call, and reject the call, in response to the held call signal through the entertainment system during the program play;
   handling the held call according to a call handling option selected by the user through the entertainment system and provided via the data network to the telephony-network-resident call management server; and
   taking the held call directly at the entertainment system call manager by answering the held call using a telephone function of the entertainment system call manager, or sending the held call by the entertainment system call manager to a user voice mail at the user's premise, or both, according to the held call handling option selected by the user.

2. The method as claimed in claim 1, further comprising buffering the program being played through the entertainment system when the held call signal is received.

3. The method as claimed in claim 1, further comprising buffering the program being played through the entertainment system in response to a specific user request.

4. The method as claimed in claim 1, wherein the held call at the telephony-network-resident cell management server is a text message.

5. The method as claimed in claim 4, wherein the text message is displayed through the entertainment system.

6. A method according to claim 2, wherein the buffering comprises wirelessly controlling by the entertainment system call manager a program buffer at a premise of the user to buffer the program.

7. A call management system comprising:
   a call management server residing in a telephony provider network and in communication with a subscriber entertainment system via Internet and/or cable data networks, and holding a call on the telephony provider network for the subscriber entertainment system prior to routing the call to the subscriber entertainment system; and
   a television call manager connected to the subscriber entertainment system to receive a held call signal from the call management server via the data network indicating a held call during a program play by the subscriber entertainment system,
   wherein the held call at the telephony-network-resident call management server is handled according to a selectable call handling option chosen from a group of call handling options comprising one or more of take the call, send the call to voice mail, forward the call to another number, play a message, ignore the call, and reject the call, and the television call manager of the subscriber entertainment system transmits via the data network the selected call handling option to the telephony-network-resident call management server, and
   wherein the television call manager comprises a telephone to enable taking the held call directly at the television call manager by answering the held call using the telephone, or sending the held call to a user voice mail at the users premise, or both.

8. The call management system as claimed in claim 7, further comprising a television buffering device connected to the subscriber entertainment system to buffer and record the television program played through the subscriber entertainment system in response to the held call signal transmitted from the television call manager when the call is held at the telephony-network-resident call management server.

9. The call management system as claimed in claim 7, wherein the call handling option for the selection are displayed through the subscriber entertainment system.

10. The call management system as claimed in claim 7, further comprising a remote control device in communication with the television call manager, wherein the subscriber selects the call handling option with the remote control device.

11. The call management system as claimed in claim 7, wherein the subscriber entertainment system comprises the television.

12. The call management system as claimed in claim 7, further comprising a television detector in communication with the television to detect when the television is on and to signal the telephony-network-resident call management server, via the data network, to route calls on the telephony provider network through the telephony-network-resident call management server.

13. The call management system as claimed in claim 7, wherein a caller identification corresponding to the held call at the telephony-network-resident call management server is provided, via the data network, to the television call manager of the subscriber entertainment system and displayed through the subscriber entertainment system.

14. The call management system as claimed in claim 7, wherein if the selected call handling option is to take the call, the telephony-network-resident call management server forwards the call via the telephony network to the television call manager of the subscriber entertainment system.

15. The cell management system as claimed in claim 14, wherein the held call at the telephony-network-resident call management server is answered via the telephony network through the subscriber entertainment system.

16. The call management system as claimed in claim 7, further comprising a television buffering device connected to the subscriber entertainment system to buffer and record the television program played through the subscriber entertainment system in response to the call handling option selection, if the selected call handling option is to take the held call.

17. A system according to claim 7, further comprising:
   a television buffering device at the users premise and connected to the subscriber entertainment system to buffer and record a program played through the subscriber entertainment system,
   wherein the television call manager wirelessly controls the television buffering device to buffer and record the program, when the television call manager receives the held call signal from the telephony-network-resident call management server.

18. A system according to claim 7, wherein the television call manager comprises:
an audio and/or video processor to process input audio and/or video data from the telephone and/or from a broadcast center for the subscriber entertainment system.

19. An entertainment system call manager to manage calls, comprising:
a telephony-network-resident call management server to hold a call on the telephony provider network prior to routing the call to a user's premise;
entertainment system means at the user's premise for processing data, including an audio and/or video program, and for:
notifying, via a data network, the call management server residing in the telephony provider network to monitor calls on the telephony provider network for the entertainment system means,
receiving a held call signal indicating a held call to the user, during a program play by the entertainment system means, via the data network from the telephony-network-resident call management server,
presenting a selectable call handling option chosen from a group comprising one or more of take the call, send the call to voice mail, forward the call to another number, play a message, ignore the call, and reject the call, in response to the held call signal through the entertainment system means during the program play, and
handling the held call according to a call handling option selected by the user through the entertainment system means and provided via the data network to the telephony-network-resident call management server, including answering the held call directly at the entertainment system means, or sending the held call by the entertainment system means to a user voice mail at the user's premise, or both, according to the held call handling option selected by the user.

20. A method, comprising:
providing a telephony-network-resident call management server to hold a call on the telephony provider network prior to routing the call to a user's premise;
providing a call manager communicably connected to an entertainment system at the user's premise, which processes data, including an audio and/or video program, to perform a process comprising:
to notify, via a data network, the call management server residing in the telephony provider network to monitor and hold a call on the telephony network for the user prior to routing the call to the user's premise,
to receive a held call signal indicating a held call, during a program play by the entertainment system to the user, via the data network from the telephony-network-resident call management server,
to automatically pause and record the program played through the entertainment system when the held call signal is received by wirelessly controlling a buffer at the user's premise,
to present through the entertainment system a selectable call handling option chosen from a group comprising one or more of take the call, send the call to voice mail, forward the call to another number, play a message, ignore the call, and reject the call, in response to the held call signal through the entertainment system during the program play,
to handle the held call according to a call handling option selected by the user through the entertainment system and provided via the data network to the telephony-network-resident call management server,
to take the held call by answering the held call using a telephone function of the call manager, or to send the held call to a user voice mail at the user's premise, or both, directly at the call manager according to the call handling option selected by the user, and
to resume playing the program when the held call at the telephony-network-resident call management server is terminated.

* * * * *

UNITED STATES PATENT AND TRADEMARK OFFICE
CERTIFICATE OF CORRECTION

PATENT NO. : 7,184,522 B2  Page 1 of 1
APPLICATION NO. : 09/855839
DATED : February 27, 2007
INVENTOR(S) : Michael J. Brunelle et al.

It is certified that error appears in the above-identified patent and that said Letters Patent is hereby corrected as shown below:

Column 7, Line 43, change "cell" to --call--.

Column 8, Line 11, change "users" to --user's--.

Column 8, Line 49, change "cell" to --call--.

Column 8, Line 61, change "users" to --user's--.

Signed and Sealed this

Thirteenth Day of May, 2008

JON W. DUDAS
*Director of the United States Patent and Trademark Office*